(12) United States Patent
Kepchar

(10) Patent No.: US 11,723,316 B2
(45) Date of Patent: Aug. 15, 2023

(54) PEST CONTROL WITH ULTRAVIOLET LIGHT

(71) Applicant: IntraLight, LLC, Boulder, CO (US)

(72) Inventor: Simon D. Kepchar, Boulder, CO (US)

(73) Assignee: INTRALIGHT, LLC, Bouler, CO (US)

( * ) Notice: Subject to any disclaimer, the term of this patent is extended or adjusted under 35 U.S.C. 154(b) by 0 days.

(21) Appl. No.: 17/735,550

(22) Filed: May 3, 2022

(65) Prior Publication Data
US 2023/0012068 A1    Jan. 12, 2023

Related U.S. Application Data

(60) Provisional application No. 63/220,605, filed on Jul. 12, 2021.

(51) Int. Cl.
*A01G 7/04* (2006.01)
*H05B 47/165* (2020.01)
*H05B 47/16* (2020.01)
*A01G 9/24* (2006.01)

(52) U.S. Cl.
CPC ............. *A01G 7/045* (2013.01); *A01G 9/249* (2019.05); *H05B 47/16* (2020.01); *H05B 47/165* (2020.01)

(58) Field of Classification Search
CPC ........ A01G 7/045; A01G 9/249; H05B 47/16; H05B 47/165
See application file for complete search history.

(56) References Cited

U.S. PATENT DOCUMENTS

| | | | |
|---|---|---|---|
| 2013/0301258 A1* | 11/2013 | Aoki ........................ | A61L 2/084 362/231 |
| 2018/0049421 A1* | 2/2018 | Hachiya ................ | A01M 1/226 |
| 2019/0259108 A1* | 8/2019 | Bongartz ........... | G06Q 10/0639 |
| 2020/0053856 A1* | 2/2020 | Barber ....................... | G01J 1/42 |
| 2020/0060099 A1* | 2/2020 | Kim ........................ | H05B 47/16 |

FOREIGN PATENT DOCUMENTS

| | | | |
|---|---|---|---|
| CN | 2556468 Y | * | 6/2003 |
| KR | 20170000661 U | * | 2/2017 |

OTHER PUBLICATIONS

Aarrouf, Jawad, and Laurent Urban; Flashes of UV-C light: An innovative method for stimulating plant defenses; PloS one vol. 15, 7, 2020, doi: 10.1371/journal.pone.0235918.
(Continued)

*Primary Examiner* — Renan Luque
(74) *Attorney, Agent, or Firm* — Jake M. Gipson; Bradley Arant Boult Cummings LLP

(57) ABSTRACT

A method for treating pest infestation of crops includes withholding all light from the crops and, during the withholding, applying a burst of ultraviolet light to the crops. A method for reducing pests includes turning off all lighting arranged to apply growth light to the crops, applying a burst of ultraviolet light to the crops and turning on the lighting arranged to apply growth light to the crops. A system for treating pest infestation of crops includes a plurality of ultraviolet light sources and a controller configured to energize the ultraviolet light sources to apply a burst of ultraviolet light to the crops.

18 Claims, 9 Drawing Sheets

(56) References Cited

OTHER PUBLICATIONS

Ali, Arif et al.; Influence of UV-A radiation on oxidative stress and antioxidant enzymes in Mythimna separata; Environmental Science and Pollution Research vol. 24, 2017, 8392-8398. doi: 10.1007/s11356-017-8514-7.

Austin, Craig and Wayne F. Wilcox; Effects of Sunlight Exposure on Grapevine Powdery Mildew Development; Phytopathology, vol. 102, 2012, 857-866. doi: 10.1094/PHYTO-07-11-0205.

Beard, R.; Lethal Action of UV Irradiation on Insects; Journal of Economic Entomology vol. 65,3, 1972, 650-4. doi: 10.1093/jee/65.3.650.

Faruki, S. et al.; Effects of ultraviolet (254nm) irradiation on egg hatching and adult emergence of the flour beetles, Tribolium castaneum, T. confusum and the almond moth, Cadra cautella; Journal of Insect Science vol. 7, 2007, 1-6. doi: 10.1673/031.007.3601.

Hori, Masatoshi et al.; Lethal effect of blue light on strawberry leaf beetle, Galerucella grisescens (Coleoptera: Chrysomelidae); Scientific Reports vol. 7 2694, 2017, doi: 10.1038/s41598-017-03017-z.

Hori, Masatoshi et al.; Lethal effects of short-wavelength visible light on insects; Scientific Reports vol. 4 7383, 2014, doi: 10.1038/srep07383.

Koveos, Dimitrios et al.; Egg hatching response to a range of ultraviolet-B (UV-B) radiation doses for four predatory mites and the herbivorous spider mite Tetranychus urticae; Experimental & Applied Acarology vol. 71,1, 2017, 35-46. doi: 10.1007/s10493-016-0102-x.

Ohtsuka, Keiko and Masahiro Osakabe; Deleterious Effects of UV-B Radiation on Herbivorous Spider Mites They Can Avoid It by Remaining on Lower Leaf Surfaces Environmental Entomology, vol. 38,3, 2009, 920-929, doi: 10.1603/022.038.0346.

Sakai, Yuta and Masahiro Osakabe; Spectrum-specific Damage and Solar Ultraviolet Radiation Avoidance in the Two-spotted Spider Mite; Photochemistry and Photobiology vol. 86, 2010, 925-932. doi: /10.1111/i.1751-1097.2010.00739.x.

Shibuya, Kazuki et al.; Toxic wavelength of blue light changes as insects grow; PLoS One, vol. 19,13(6):e0199266, 2018, doi: 10.1371/journal.pone.0199266.

Short, Brent et al.; UV-C irradiation as a management tool for Tetranychus urticae on strawberries; Pest Management Science, vol. 74,11, 2018, 2419-2423 doi: 10.1002/ps.5045.

Suthaparan, Aruppillai et al.; Suppression of Cucumber Powdery Mildew by Supplemental UV-B Radiation in Greenhouses Can be Augmented or Reduced by Background Radiation Quality; Plant Disease, vol. 98,10, 2014, 1349-1357. doi: 10.1094/PDIS-03-13-0222-RE.

Suthaparan, Aruppillai et al.; Suppression of Powdery Mildew (Podosphaera pannosa) in Greenhouse Roses by Brief Exposure to Supplemental UV-B radiation; Plant Disease, vol. 96,11, 2012,1653-1660. doi: 10.1094/PDIS-01-12-0094-RE.

Suthaparan, Aruppillai et al.; Suppression of Powdery Mildews by UV-B: Application Frequency and Timing, Dose, Reflectance, and Automation; Plant Disease, vol. 100,8, 2016, 1643-1650. doi: 10.1094/PDIS-12-15-1440-RE.

Suzuki, Takeshi et al.; An LED-based UV-B irradiation system for tiny organisms: System description and demonstration experiment to determine the hatchability of eggs from four Tetranychus spider mite species from Okinawa; .Journal of Insect Physiology, vol. 62, 2014, 1-10, doi: 10.1016/j.jinsphys.2014.01.005.

Tanaka, Masaya et al.; Physical Control of Spider Mites Using Ultraviolet-B with Light Reflection Sheets in Greenhouse Strawberries; Journal of Economic Entomology, vol. 109, 2016, 1758-65. doi: 10.1093/jee/tow096.

Yoshioka, Yoshio et al.; UV-B susceptibility and photoreactivation in embryonic development of the two-spotted spider mite, Tetranychus urticae; Experimental and Applied Acarology, vol. 75,2, 2018, 155-166. doi: 10.1007/s10493-018-0263-x.

* cited by examiner

PEST CONTROL WITH ULTRAVIOLET LIGHT

CROSS REFERENCE TO RELATED APPLICATIONS

This application claims the priority benefit of U.S. Provisional Application No. 63/220,605 filed 2021 Jul. 12, which is incorporated herein by reference in its entirety.

TECHNICAL FIELD

The present disclosure pertains to pest control and/or management.

BACKGROUND

Pest and pathogen infestations in agriculture, along with the reduction in produce value persist in spite of consistent expenses including chemical purchasing and labor associated with traditional pest management methods.

SUMMARY

The disclosure describes a method for treating pest infestation of crops. The method includes withholding all light from the crops and, during the withholding, applying a burst of ultraviolet light to the crops.

The disclosure also describes a method for reducing pests. The method for reducing pests includes turning off all lighting arranged to apply growth light to one or more crops, applying a burst of ultraviolet light to the crops and turning on the lighting arranged to apply growth light to the crops.

The disclosure also describes a system for treating pest infestation of crops. The system includes a plurality of ultraviolet light sources and a controller configured to energize the ultraviolet light sources to apply a burst of ultraviolet light to the crops.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the disclosure and manners by which they can be implemented. Although the preferred mode of carrying out the present disclosure has been described, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the disclosure substantially eliminate, or at least partially address, problems in the prior art, enabling damaging pests and pathogens without leaving any residue on crops and without requiring any application labor or continued expense on the part of the farmer.

Disclosed methods and systems damage the DNA of pests and pathogens, reducing their fecundity, maturation rates and hatchability of their eggs dramatically. For example, fecundity, maturation rates and hatchability may be reduced up to 99% when exposure is complete. Airborne pathogens and spores are also easily sterilized, along with spores and pathogens on the undersides of leaves, and some on the top sides of leaves hit by bouncing rays.

Additional aspects, advantages, features and objects of the disclosure will be made apparent from the drawings and the detailed description of the illustrative embodiments construed in conjunction with the appended claims that follow. It will be appreciated that described features are susceptible to being combined in various combinations without departing from the scope of the disclosure as defined by the appended claims.

Disclosed methods and associated systems are suitable for treating pest infestation of crops, mitigating pest damage to crops, reducing pest damage to crops, mitigating pest numbers, reducing pests, controlling pests and/or controlling crop damage by pests.

Figure 1:
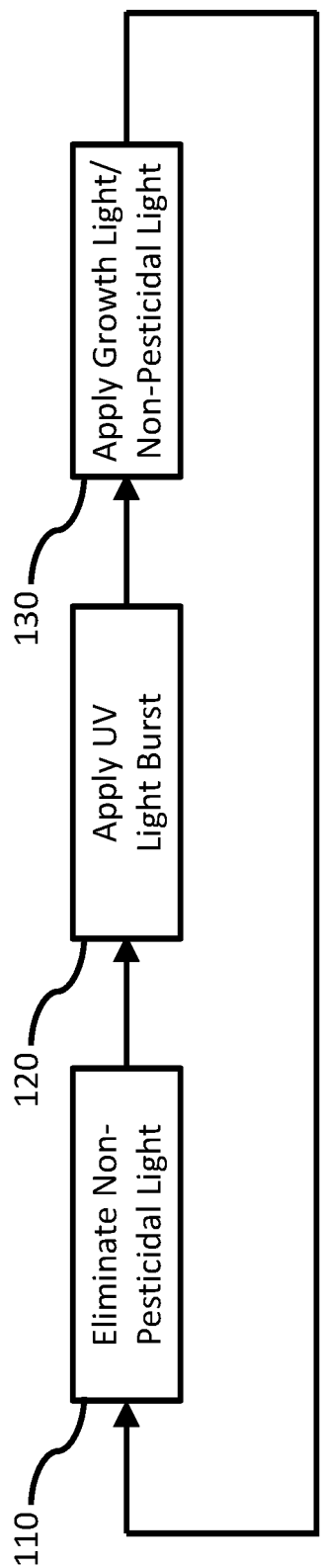
FIG. 1 illustrates a pest control method.

FIG. 1 illustrates an example method. The method includes, withholding or otherwise eliminating non-pesticidal light at 110, for example, by turning off all lighting arranged to apply growth light to the plants and applying a burst of ultraviolet light (UV) to crops at 120 during a dark period when no other light spectra are present. In an example, applying the burst of UV light further includes applying the burst for a duration of between 1 second and 200 seconds. In a further example, the burst of UV light is applied for a duration of about 60 seconds.

The burst applied may be suitable to treat infestation by mites, aphids and/or thrips while leaving the growing, living crops unharmed. Lack of other light spectra in accordance with action 110 prevents inbuilt, photo-reactive DNA repair mechanisms of the pests from acting to repair UV damage caused by the burst. Other lighting, such as that arranged to apply growth light to the crops, may be turned back on at 130.

The burst may be applied with a plurality of light-emitting diodes. Applying the burst of UV light may further include applying the burst at wavelengths between 100 nm and 400 nm. In an example, the burst of UV light is applied at wavelengths between 250 nm and 355 nm. In a further example, the burst of UV light is applied at wavelengths of about 280 nm.

Since the undersides of leaves are a common place for pests to congregate, as they prefer shaded areas and the softer leaf surface on the underside of leaves, the burst may be applied to leaf undersides of the crops and/or underneath a canopy of the crops.

The method may further include repeating the eliminating/withholding non-pesticidal light, the applying the burst and the applying the non-pesticidal light on an interval. In an example, the eliminating/withholding and applying are repeated on 24-hour or 48-hour intervals. In an example, simply choosing an interval which coincides with an otherwise planned or programmed dark interval for the plants will satisfy applying the burst when no other light spectra are present. In another example, some undesirable ambient light may need to be blocked from the plants in addition to choosing an interval which coincides with an otherwise planned or programmed dark interval for the plants.

The following examples describe various experimental applications of ultraviolet light to plants/crops with various infestations and/or pathogens.

Example I

When, in the presence of growth light, 255 nm and 310 nm light was applied in a 60 second burst at an intensity of 20 µW/cm$^2$ to plants having infection and pests blight lesion number was reduced 17-20%, botrytis lesion number was reduced 40%, powdery mildew lesion number was reduced 50%, powdery mildew lesion surface area was reduced 50%, aphid population was reduced 50%, spider mite population was reduced 50% and thrip population was reduced 40%.

Example II

When, in the absence of growth light, 255 nm and 310 nm light was applied in a 60 second burst at an intensity of 20 µW/cm$^2$ to plants having infection and pests blight lesion number was reduced 75-85%, botrytis lesion number was reduced 88-95%, powdery mildew lesion number was reduced 90-100%, aphid population was reduced 95%, spider mite population was reduced 95% and thrip population was reduced 80-85%.

Example III

When, in the absence of growth light, 280 nm light was applied in a 60 second burst at an intensity of 20 µW/cm$^2$ to plants having mildew and pests blight lesion number was reduced 40-50%, botrytis lesion number was reduced 50-55%, botrytis surface area was reduced 50-55%, powdery mildew lesion number was reduced 70-85%, powdery mildew lesion surface area was reduced 70-85%, aphid population was reduced 75%, spider mite population was reduced 75% and thrip population was reduced 75%.

Example IV

When, in the absence of growth light, 280 nm light was applied in a 60 second burst at an intensity of 30 µW/cm$^2$ to plants having mildew and pests blight lesion number was reduced 55-60%, botrytis lesion number was reduced 75-100%, powdery mildew lesion number was reduced 50-100, aphid population was reduced 95-100%, spider mite population was reduced 95-100% and thrip population was reduced 95-100%.

Disclosed methods with consideration for the above examples, may be performed with various systems for treating pest infestation of crops, mitigating pest damage to crops, reducing pest damage to crops, mitigating pest numbers, reducing pests, controlling pests and/or controlling crop damage by pests.

Figure 2:
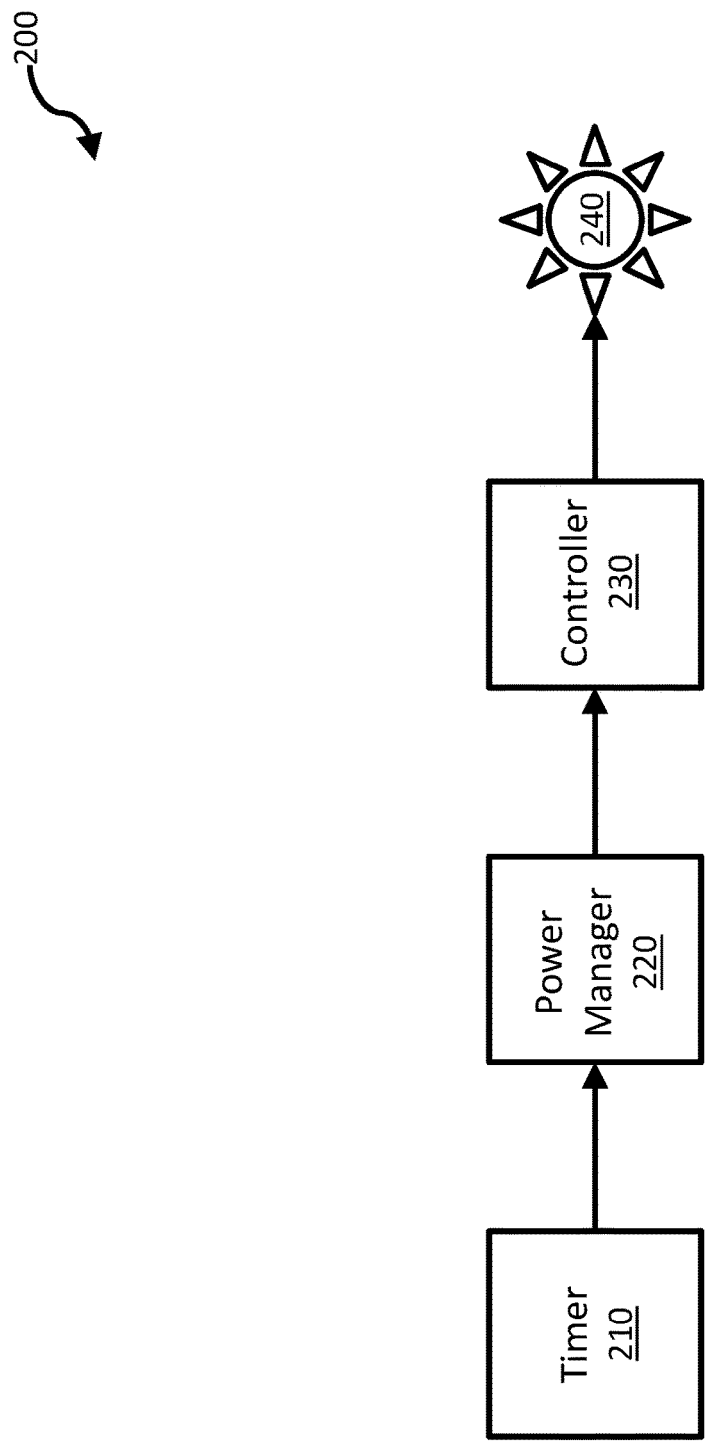
FIG. 2 illustrates a schematic of example components suitable for use in association with disclosed systems for treating pest infestation of plants.

Referring to FIG. 2, one of the various systems 200 includes a timer 210 which controls power input to a power manager 220 to energize a LED controller/driver 230 for a duration of between 1 and 200 seconds to, in turn, illuminate ultraviolet light sources 240. In an example, timer 210 is configured to input power to power manager 220 to energize LED controller/driver 230 for a duration of 60 seconds.

Timer 210 may be configured to allow power to flow through power manager 220 to the UV light sources 240 on an interval while all growth light is being withheld from the crops. In an example, timer 210 is configured to allow power to flow through power manager 220 to LED controller/driver 230 and UV light sources 240 on a 48-hour interval. In a further example, timer 210 is configured to allow power to flow through power manager 220 to LED controller/driver 230 and UV light sources 240 on an interval of about 24 hours.

Figure 3:
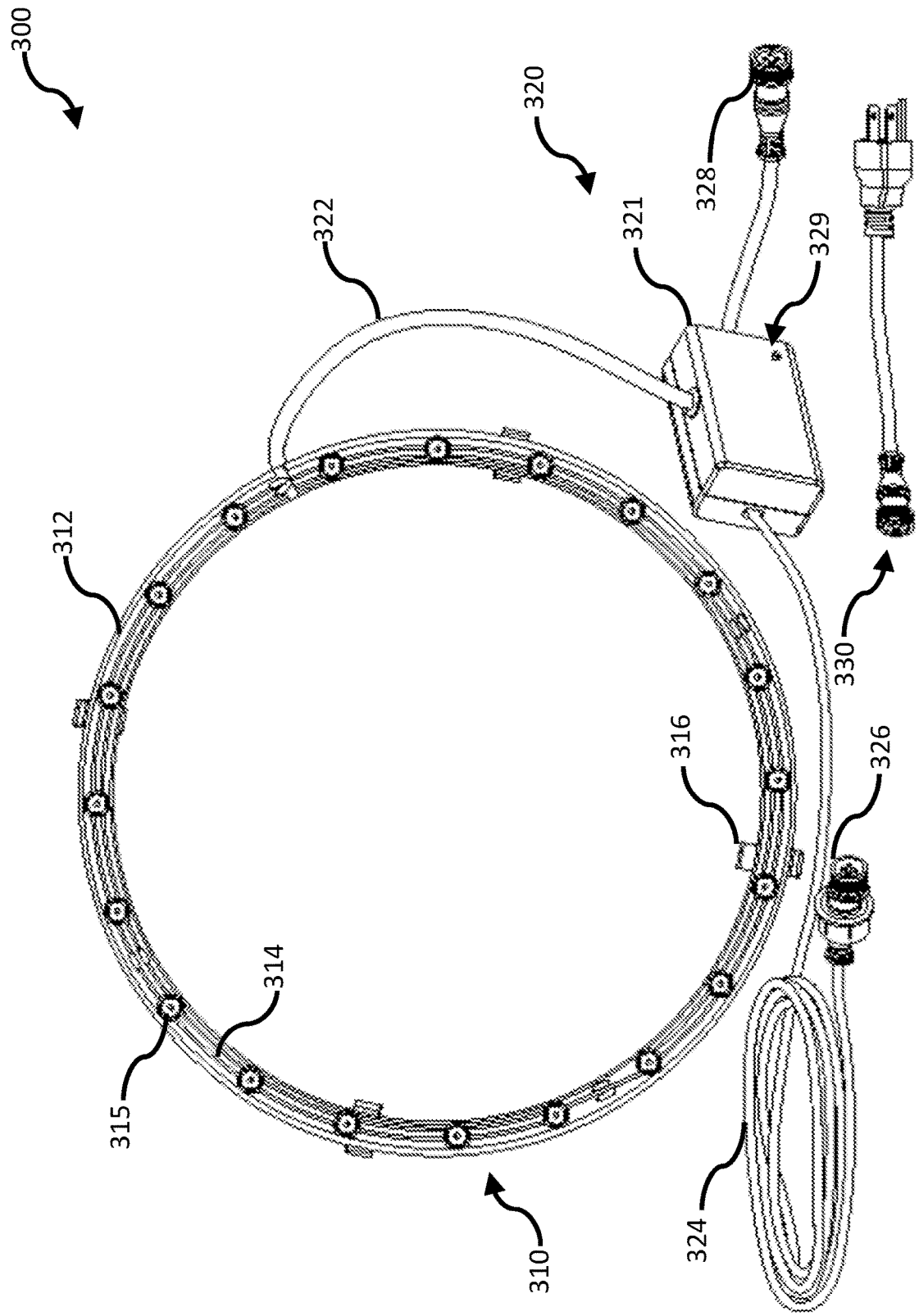
FIG. 3 illustrates a top or frontside view of an example systems for treating pest infestation of plants.
Figure 4:
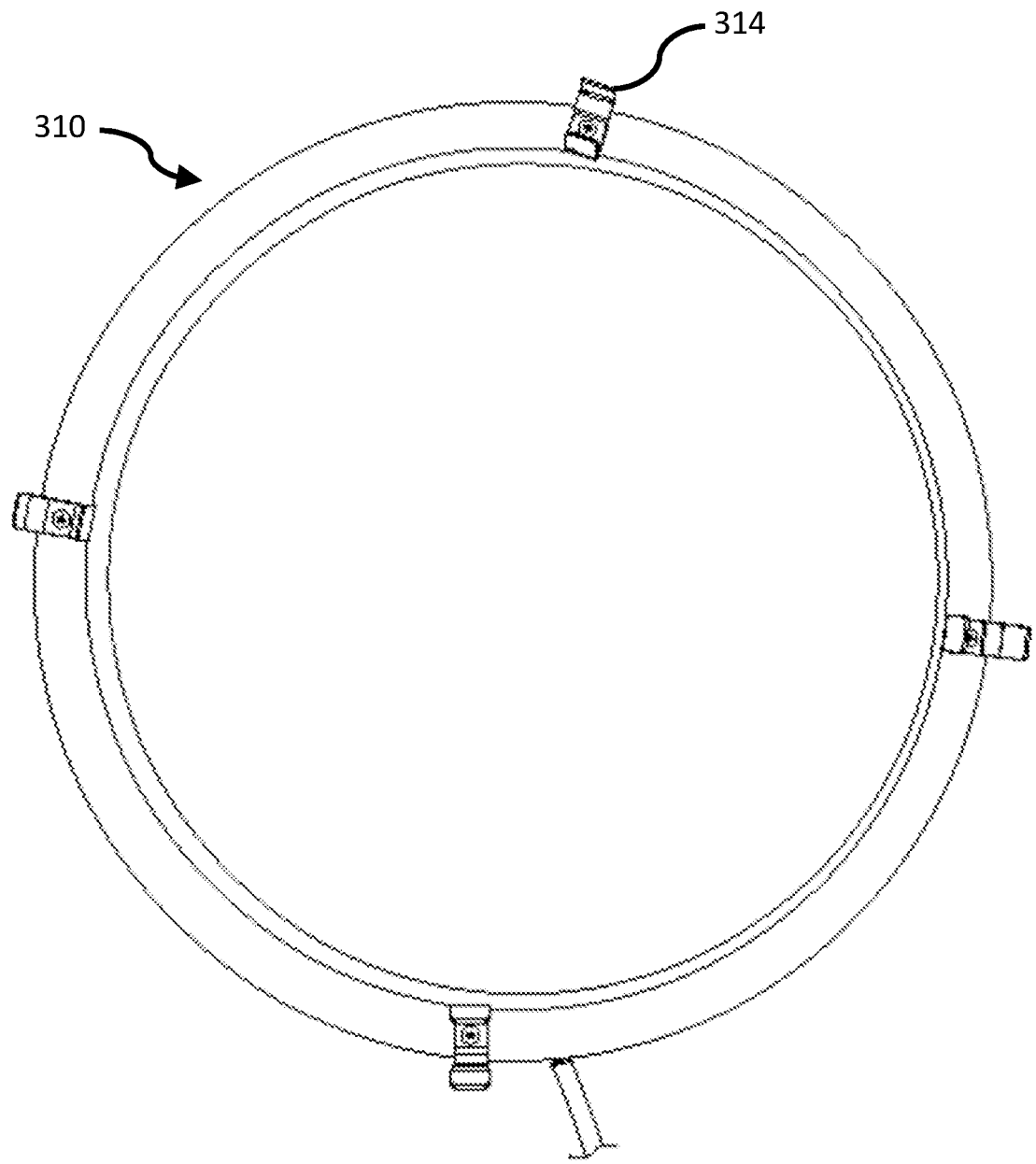
FIG. 4 illustrates a bottom or backside view of the system for treating pest infestation of plants as shown by way of example in FIG. 3.
Figure 5:
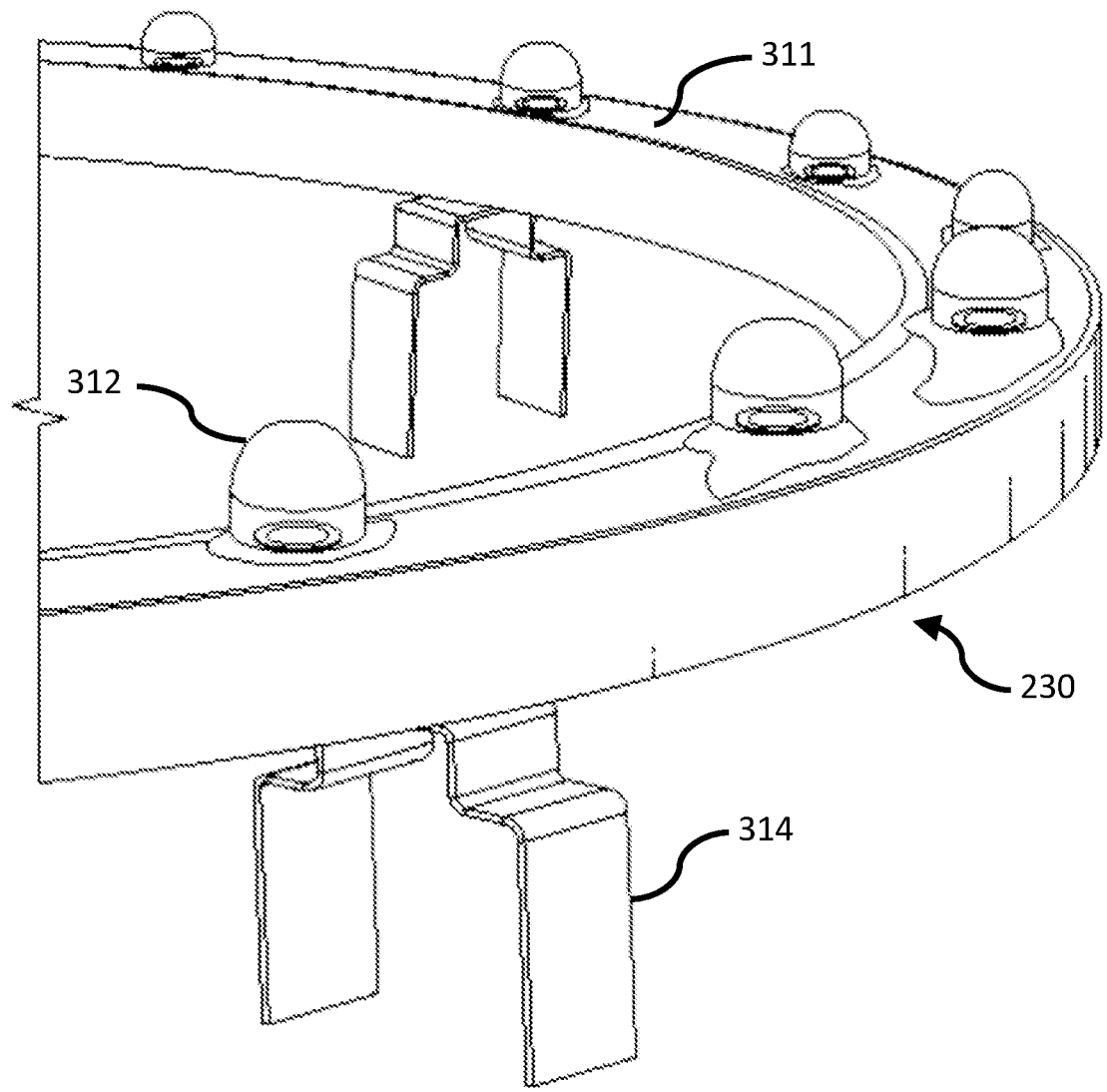
FIG. 5 illustrates a close-up, partial side view of the example system for treating pest infestation of plants as shown by way of example in FIGS. 3 & 4.

FIGS. 3-5 illustrate an example set 300 of components suitable for supporting methods for treating pest infestation of crops. Example components 300 include a fixture 310, a power management platform 320 and a power connector 330.

Fixture 310 has a plurality of UV light sources 315 and an LED controller/driver in the form of a printed circuit board (PCB) 314 configured to energize light sources 315 to apply UV light to crops or other plants. Light sources 315 may be an example of light sources 240 and PCB controller 314 may be an example of LED controller/driver 230.

UV light sources 315 and/or the wavelengths emitted therefrom may be suitable to treat infestation by any of a variety of insects including but not limited to soft-bodied insects such as mites, aphids and/or thrips while leaving the growing, living crops unharmed. In an example, UV light sources 315 are configured to emit light at wavelengths between 100 nm and 400 nm. In a further example, UV light sources 315 are configured to emit light at wavelengths between 250 nm and 355 nm.

Figure 6:
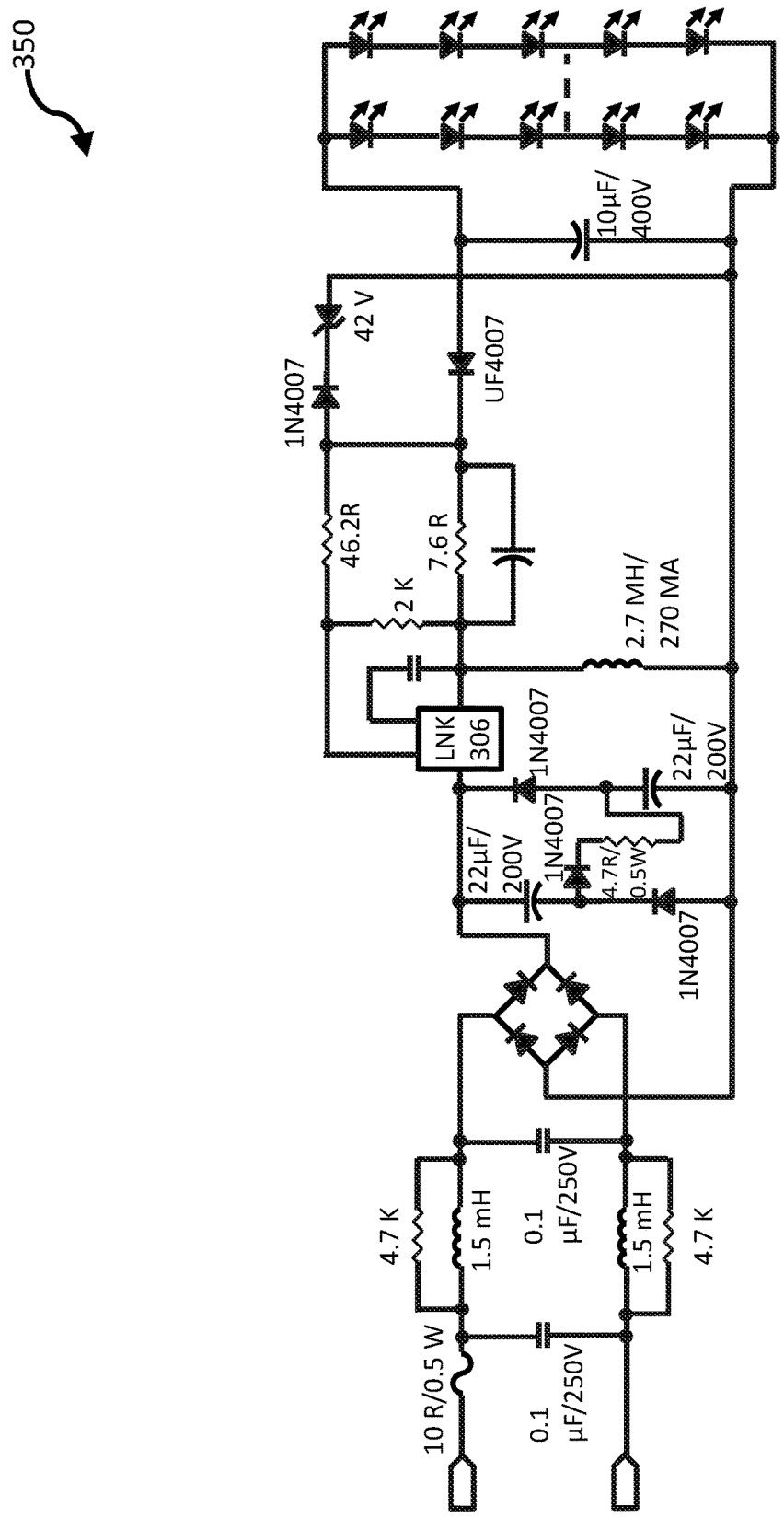
FIG. 6 illustrates a circuit suitable for use in association with disclosed system for treating pest infestation of plants.

In an example, UV light sources 315 may be configured in accordance with PCB controller 314 to energize UV light sources 315 to apply the burst at wavelengths between 100 nm and 400 nm. In a further example, the PCB controller 314 may be configured to energize UV light sources 315 to apply the burst at wavelengths between 250 nm and 355 nm. In a still further example, PCB controller 314 is configured to energize UV light sources 315 to apply the burst at wavelengths of about 280 nm. FIG. 6 illustrates a circuit 350 suitable for use as PCB controller 314.

To form fixture 310, UV light sources 315 may be arranged on PCB controller 314 at a first side of a frame 312 having a central opening. While frame 312 may take any of a variety of shapes suitable for supporting and/or housing PCB controller 314 and light sources 315, in an example, frame 312 takes a ring or annular shape having an outer diameter and an inner diameter. A recessed portion or a trough between the inner and outer diameters houses and/or holds PCB controller 314 to which light sources 315 are operatively coupled, for example, by mounting. Frame 312 may be formed from any of a variety of lightweight, durable materials by any of a variety of techniques. In an example, frame 312 is extruded from aluminum.

Each of light sources 315 may be covered by a lens to facilitate and/or control light propagation. Space between the lenses is filled, for example, with epoxy or silica gel. In an example, the lenses are provided as quartz glass beads (FIG. 5). While system 300, illustrated by way of example in FIGS. 3-5, includes twenty UV light sources 315, any number of light sources suitable for treating pest infestation of crops may be provided.

Figure 7:
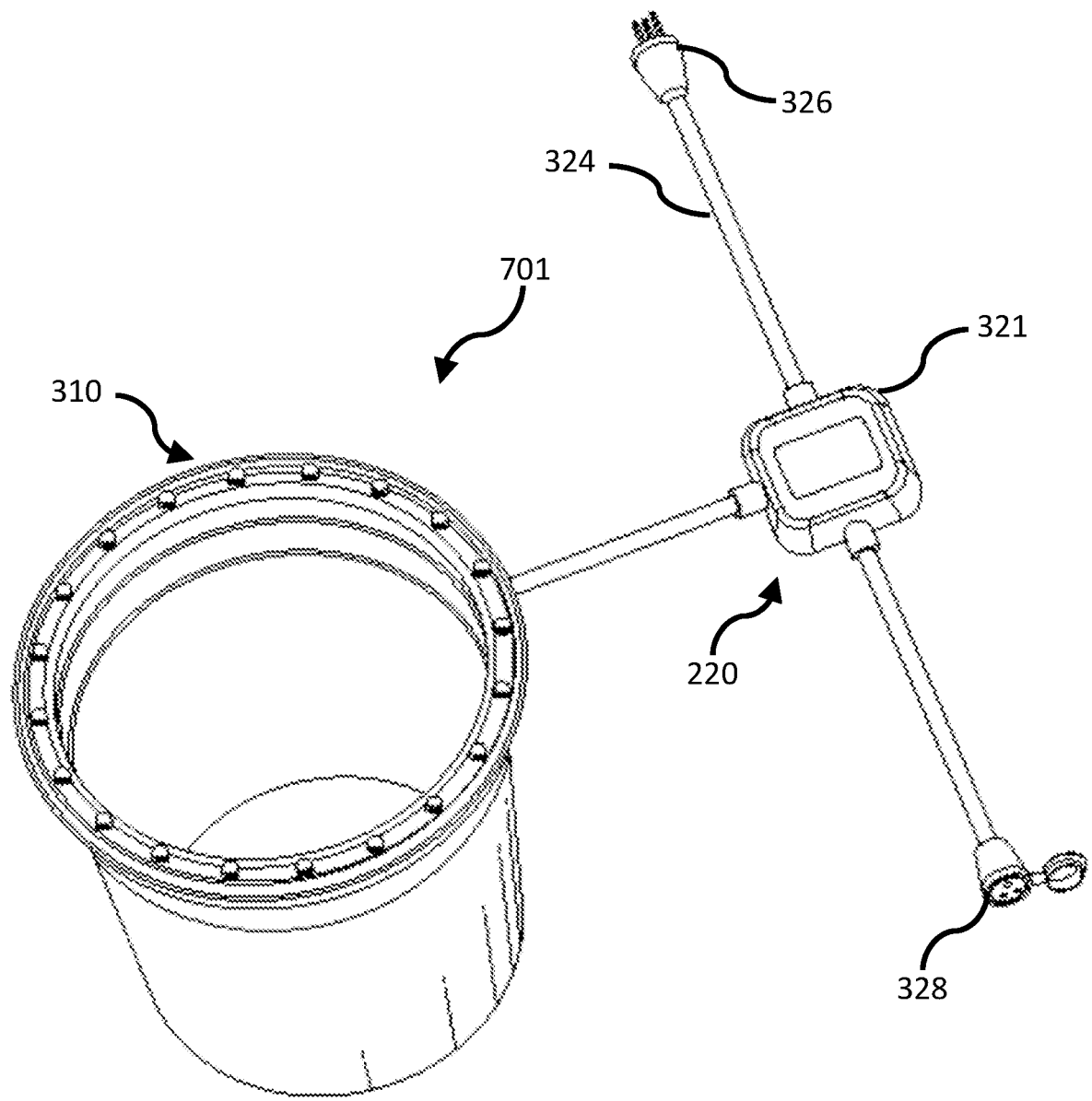
FIG. 7 illustrates components of an example system for treating pest infestation of plants provided to an example crop-growing media container.

A plurality of clips 316, such as bucket clips, may be provided to a second side of the fixture/frame, opposite the first side, PCB controller 314 and light sources 315. In an example, clips 316 are provided to a bottom of fixture 310. Clips 316 are configured to grip a rim of a plant/crop pot, planter or other container for crop-growing media. FIG. 7 illustrates system 300 for treating pest infestation of crops provided to an example crop-growing media container 701. In this arrangement, UV light sources 315 may be directed toward leaf undersides of the crops and/or underneath a canopy of the crops. Clips 316 may be formed from any of a variety of lightweight, durable materials including but not limited to aluminum.

Power management platform 320 (FIG. 3), which may be an example of power manager 220, includes a cord 322 leading from PCB controller 314 to transformer 321. In an example, transformer 321 includes a power-in lead cable 326 having a male 3-prong plug and a power-out lead cable 328 having female 3-prong terminal. In another example, power-in lead cable 326 has a female 3-prong plug and power-out lead cable 328 has a male 3-prong terminal.

Power-in lead cable 326 is configured to ingress protection standard 65 and configured to be totally dust tight and for protection against low pressure jets of moisture. Power-out lead cable 328, which may also be configured to ingress protection standard 65 is configured for connection to another power-in lead cable having a 3-prong male terminal. Additionally/alternatively, power-in lead cable 326 and power-out lead cable 328 include waterproof m12 connectors.

In an example, power management platform 320 includes a m12 to U.S. 3-prong male terminal power connector plug 330. Terminal power connector plug 330 has a first end configured for connecting with transformer 321, for example, through power-in lead 326 and a second end configured for connecting with a household or industrial socket/outlet (not shown). In another example, the second end may be configured for connecting with a household or industrial socket/outlet through a timer.

The system may further include an on/off indicator 329 provided to transformer 321 and/or fixture 310. In an example on/off indicator is a visible light 329. In a further example, the visible light takes the form of an LED.

Figure 8:
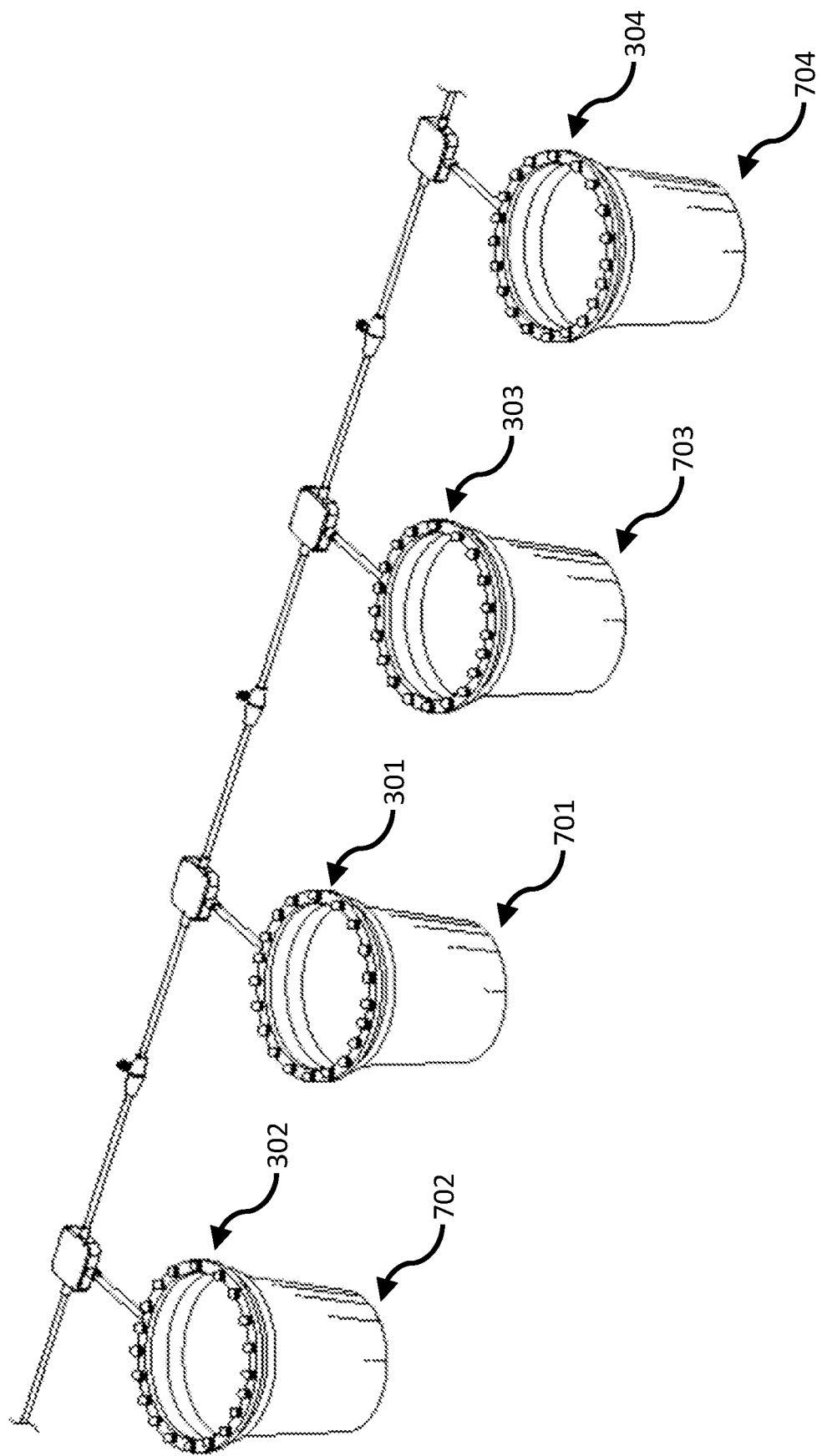
FIG. 8 illustrates series coupling of several example infestation-treating fixtures.
Figure 9:
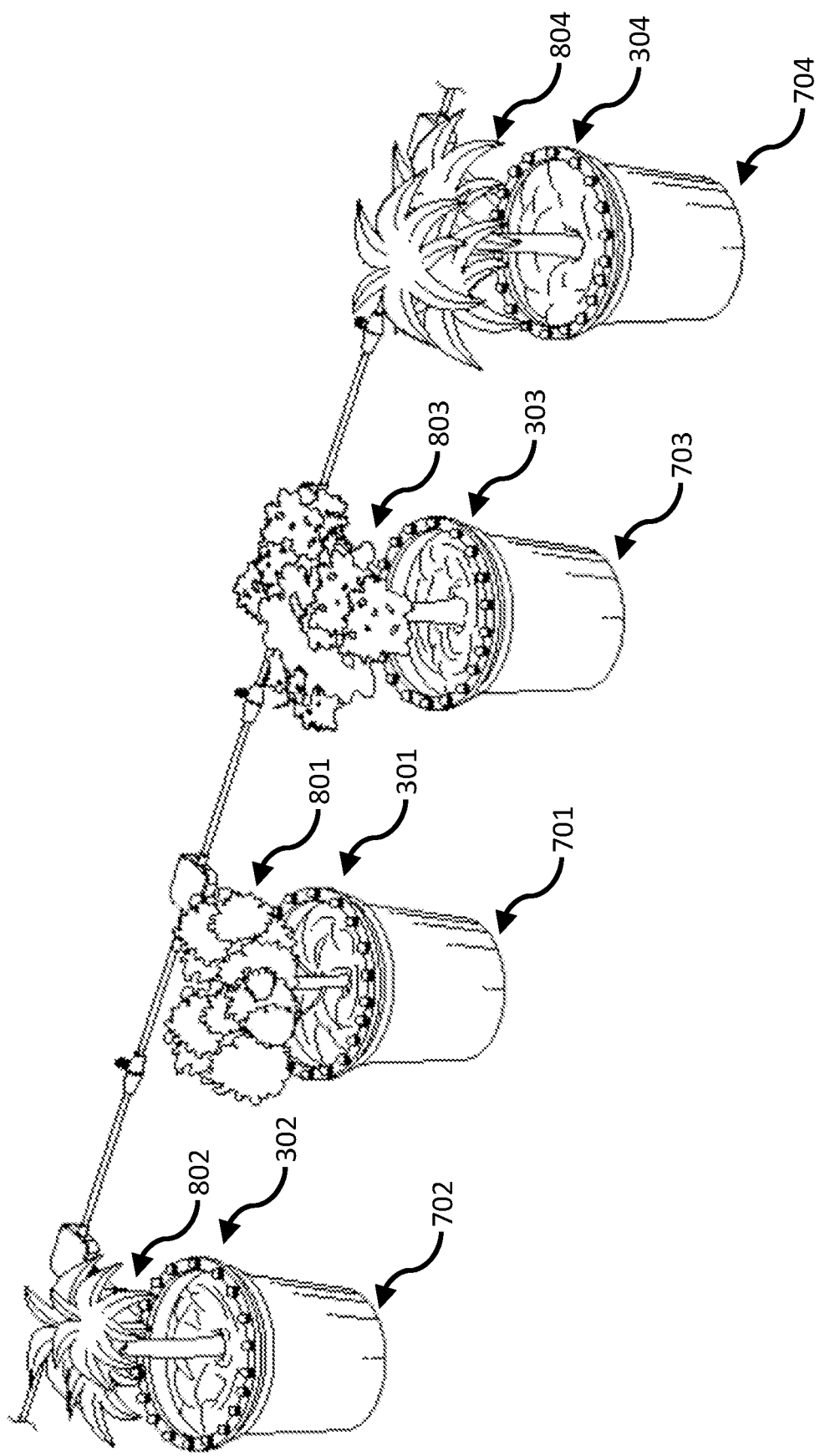
FIG. 9 illustrates plants configured for treatment by several series-coupled, example infestation-treating fixtures.

Through transformer 321, power-out lead cable 328 and power-in lead cable 326, a fixture 301 may be coupled in series with one or more additional fixtures 302, 303, 304. FIG. 8 illustrates, coupled with a number of pots/planters 702, 701, 703 and 704, series coupling of several example infestation-treating fixtures 302, 301, 303 and 304 which may be examples of fixture 310. While the example series of infestation-treating fixtures includes four fixtures, any suitable number of fixtures may be provided for treating a number of plants and/or media containers of the user up to and including 90 fixtures. FIG. 9 illustrates plants 801, 802, 803 and 804 configured for treatment by several series-coupled, example fixtures 302, 301, 303 and 304 provided to a number of pots/planters 702, 701, 703 and 704, respectively.

According to another embodiment, a strand includes nine light source modules. In an example, the strand has a length of 30 ft. Each light source module produces the anti-pest lighting individually. The ends of the strand on either end include a male and female m12 waterproof connector. Each strand may further be provided with a section of cable from m12 to U.S. 3-prong male. The connectors enable multiple strands to be connected in a secure and waterproof fashion. One or more strands may be laid along growing media below crops or to be woven through a canopy, in order to provide full coverage of the anti pest light treatment to leaf under sides. In some examples, this form of strand would be dozens or hundred of feet long and provide lighting for the side of a building.

According to yet another embodiment, an example system is configured for treating pest infestation of crops in the form of larger plants or trees in orchards where larger coverage areas are required to be irradiated. In this form factor the plant itself is able to support larger heavier lights. In an example, the system includes a series or string of 10 W bulbs, each of which produces UV light suitable to treat infestation by mites, aphids and/or thrips on a larger scale.

Modifications to embodiments of the disclosure described in the foregoing are possible without departing from the scope of the disclosure as defined by the accompanying claims. Various form factors can be utilized for different growing conditions such as traditional outdoor fields, orchards, green houses, indoor grows, and vertical farms.

Further, expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A method for treating pest infestation of crops, comprising:
    withholding all light from the crops;
    during the withholding, applying a first burst of ultraviolet light to the crops at a wavelength of about 255 nm at an intensity of about 20 µW/cm$^2$; and
    applying a second burst of ultraviolet light to the crops at a wavelength of about 310 nm at an intensity of about 20 µW/cm$^2$.

2. The method as set forth in claim 1, wherein applying the first burst of ultraviolet light further comprises applying the first burst for a duration of between 1 second and 200 seconds.

3. The method as set forth in claim 1, further comprising repeating the withholding and at least one of the applying steps on an interval.

4. The method as set forth in claim 1, wherein the applying of the first and second bursts comprises applying underneath a canopy of the crops.

5. The method as set forth in claim 1, wherein the applying of the first and second bursts further comprises applying with a plurality of light-emitting diodes.

6. The method as set forth in claim 1, wherein the first burst and the second burst are applied simultaneously.

7. A method for reducing pests, comprising:
    turning off all lighting arranged to apply growth light to one or more crops;

applying a first burst of ultraviolet light to the crops at a wavelength of about 255 nm at an intensity of about 20 µW/cm$^2$;

applying a second burst of ultraviolet light to the crops at a wavelength of about 310 nm at an intensity of about 20 µW/cm$^2$; and turning on the lighting arranged to apply growth light to the crops.

8. The method as set forth in claim 7, wherein the applying of the first and second bursts further comprises applying with a plurality of light-emitting diodes directed towards leaf undersides of the crops.

9. The method as set forth in claim 7, wherein the first burst is applied for a duration of between 1 second and 200 seconds.

10. A system for treating pest infestation of crops, comprising:

a plurality of ultraviolet light sources; and a controller configured to energize the ultraviolet light sources to apply a first burst of ultraviolet light to the crops at a wavelength of about 255 nm at an intensity of about 20 µW/cm$^2$ and to apply a second burst of ultraviolet light to the crops at a wavelength of about 310 nm at an intensity of about 20 µW/cm$^2$.

11. The system as set forth in claim 10, wherein the ultraviolet light sources are arranged on a first side of a frame having a central opening.

12. The system as set forth in claim 11, wherein the frame further comprises, provided to a second side of the frame opposite the first side, a plurality of bucket clips configured to grip a top rim of a planter.

13. The system as set forth in claim 10, further comprising a timer configured to allow power to flow to the ultraviolet light sources for a duration of between 1 second and 200 seconds.

14. The system as set forth in claim 13, wherein the timer is further configured to allow power to flow to the ultraviolet light sources for a duration of 60 seconds.

15. The system as set forth in claim 10, further comprising a timer configured to allow power to flow to the ultraviolet light sources on an interval.

16. The system as set forth in claim 15, wherein the timer is further configured to allow power to flow to the ultraviolet light sources on a 24-hour interval.

17. The system as set forth in claim 10, wherein the ultraviolet light sources comprise light-emitting diodes.

18. The system as set forth in claim 10, wherein the controller is further configured to apply the first and second bursts simultaneously.

* * * * *